(12) United States Patent
Hashimoto

(10) Patent No.: US 6,419,508 B2
(45) Date of Patent: Jul. 16, 2002

(54) CARD CONNECTOR HAVING INTERCHANGEABLE GUIDE ARMS

(75) Inventor: Shinichi Hashimoto, Tokyo (JP)

(73) Assignee: Tyco Electronics, AMP, K.K., Kanagawa (JP)

( * ) Notice: Subject to any disclaimer, the term of this patent is extended or adjusted under 35 U.S.C. 154(b) by 0 days.

(21) Appl. No.: 09/737,188

(22) Filed: Dec. 14, 2000

(30) Foreign Application Priority Data

Dec. 22, 1999 (JP) .......................................... 11-364392

(51) Int. Cl.⁷ .............................................. H01R 13/62
(52) U.S. Cl. ..................................................... 439/159
(58) Field of Search .............................. 439/152–160, 439/64, 377

(56) References Cited

U.S. PATENT DOCUMENTS

| | | | | |
|---|---|---|---|---|
| 5,290,174 A | * | 3/1994 | Woratyla et al. ......... | 439/377 X |
| 5,297,966 A | * | 3/1994 | Brennian, Jr. et al. .. | 439/377 X |
| 5,389,001 A | * | 2/1995 | Broschard, II et al. ..... | 439/159 |
| 5,871,365 A | * | 2/1999 | Kajiura ........................ | 439/159 |
| 6,048,214 A | | 4/2000 | Hirata et al. ................. | 439/101 |
| 6,095,830 A | | 8/2000 | Hirata et al. ................. | 439/101 |
| 6,132,243 A | | 10/2000 | Hirata et al. ............. | 439/541.5 |
| 6,174,192 B1 | * | 1/2001 | Watanabe et al. ....... | 439/159 X |

FOREIGN PATENT DOCUMENTS

JP  H 11-119861  10/1997

* cited by examiner

Primary Examiner—Brian Sircus
Assistant Examiner—Son V. Nguyen

(57) ABSTRACT

The card connector 1 has card-guiding grooves 53 and 63 that are used to accommodate and guide a card C on the left and right sides of an insulating housing 20. An ejection bar 71 is attachable to either left or right guide arms 50 and 60. The left and right guide arms 50 and 60 are formed with symmetrical structures so that they are interchangeable between the left and right sides. Furthermore, the frame 80 that connects the left and right guide arms 50 and 60 to each other and the brackets 90 that are used to attach the left and right guide arms 50 and 60 to the circuit board are each constructed so that they can be mounted on the left and right guide arms 50 and 60 from above or below.

6 Claims, 12 Drawing Sheets

(a)

(b)

(a)

(b)

(c)

(a)  (b)  (c)  (d)

(a)   (b)   (c)   (d)

(a)   (b)

(a)

(b)

(c)

CARD CONNECTOR HAVING INTERCHANGEABLE GUIDE ARMS

FIELD OF THE INVENTION

For example, the connector shown in FIG. 12 is such a card connector equipped with an ejection mechanism. This connector is disclosed in Japanese Patent Application Kokai No. H 11-119861. Card connector 100 equipped with an ejection mechanism consists of a header 110 which is mounted on a printed circuit board, a plurality of electrical contacts 112 attached to an insulating housing 111, and a shell assembly 120 equipped with an ejection mechanism, which is attached to the header 110.

BACKGROUND

Conventionally, card connectors equipped with ejection mechanisms used for the electrical connection of cards such as memory cards, communications cards and HDD packages, to circuit boards have been used in laptop and notebook type personal computers.

For example, the connector shown in FIG. 12 is such a card connector equipped with an ejection mechanism. This connector is disclosed in Japanese Patent Application Kokai No. H 11-119861. Card connector 100 equipped with an ejection mechanism consists of a header 110 which is mounted on a printed circuit board ( ), a plurality of electrical contacts 112 attached to an insulating housing 111, and a shell assembly 120 equipped with an ejection mechanism, which is attached to the header 110.

The shell assembly 120 equipped with an ejection mechanism consists of a part with a flat angular shape which is formed an upper-side shell 121 and a lower-side shell 122 which abut each other along left and right side walls. The shell 121 surrounds a card receiving cavity which accommodates two memory cards or communications cards (not shown in the figures) or one HDD package (not shown in the figures). Furthermore, independent ejection mechanisms 123 which are used to eject the accommodated cards are attached to either side wall. Each of these ejection mechanisms 123 consists of an ejection bar 124 and an arm 125. Each ejection bar 124 is installed so that it can move in a mating direction along a side wall. Furthermore, each arm 125 is installed so that it can pivot in the direction indicated by the arrows on the inside surface of the end of the upper shell 121 or lower shell 122. The end of each ejection bar 124 is connected to one end of the corresponding arm 125.

When either ejection bar 124 is urged by an ejection button 126 attached to this ejection bar 124, the arm 125 pivots and engages with the end portion of the inserted card to eject the card.

Furthermore, the card connector 100 is mounted on the circuit board as follows. The shell assembly 120 equipped with an ejection mechanism is first attached to the header 110. The entire card connector 100 is then attached to the circuit board by soldering the electrical contacts 112 of the header 110 to conductive pads on the circuit board. Attaching brackets 127 extending from the left and right side walls of the shell assembly 120 are screwed to the circuit board.

Several problems have been encountered in this conventional card connector 100. Specifically, the ejection bars 124 attached to the left or right side walls of the upper shell 121 and lower shell 122 are not interchangeable. For example, it is possible not move the ejection bars 124 attached to the right side walls of the upper shell 121 and lower shell 122 (as shown in FIG. 12) to the opposite left side walls since there is no member to which the ejection bars 124 can be attached on the left side walls. If attachment members for receiving the ejection bars 124 are installed on both the left and right side walls the width of the shell assembly 120 is increased beyond the requirement for compactness.

Furthermore, since the card connector 100 is mounted on the circuit board after being equipped with an ejection mechanism, it can not be easily replaced after the electrical contacts 112 of the header 110 have been soldered to the conductive pads of the circuit board

SUMMARY

Accordingly, the present invention was devised in order to solve the above-mentioned problems. An object of the present invention is to provide a card connector having an ejection bar that can be attached on the left or right using a minimal number of parts, while maintaining a small width dimension.

Furthermore, another object of the present invention is to provide a card connector in which the frame assembly equipped with an ejection mechanism can be simply and easily replaced even after the electrical contacts of the header have been soldered to the conductive pads on the circuit board.

Accordingly the invention provides a card connector having a header and an eject mechanism. The card connector features a pair of interchangeable guide arms disposed on right and left sides of the header, attached to a frame, and configured to selectively receive an ejection bar.

BRIEF DESCRIPTION OF THE DRAWINGS

The invention will now be described by way of example with reference to the accompanying figures of which:

FIG. 1(a) is a plan view, and FIG. 1(b) is a right-side view.

FIG. 2(a) is a plan view, FIG. 2(b) is a front view, and FIG. 2(c) is a bottom view.

FIG. 4(a) is a plan view, FIG. 4(b) is a front view, and FIG. 4(c) is a right-side view.

FIG. 5 (a) is a plan view, FIG. 5(b) is a front view, FIG. 5(c) is a right-side view, and FIG. 5 (d) is a left-side view.

FIG. 6 (a) is a back view, FIG. 6(b) is a right-side view, FIG. 6(c) is a left-side view, and FIG. 6(d) is a sectional view along line 6d—6d in FIG. 6(b).

FIG. 7(a) is a plan view. FIG. 7(b) is a right-side view, FIG. 7(c) is a left-side view, and FIG. 7(d) is a sectional view along line 7d—7d in FIG. 7(b).

FIG. 8(a) is a right-side view, and FIG. 8(b) is a back view.

FIG. 9(a) is a front view, FIG. 9(b) is a bottom view, and FIG. 9(c) is a right-side view.

FIG. 10(a) is a plan view, FIG. 10(b) is a front view, and FIG. 10(c) is a right-side view.

DETAILED DESCRIPTION OF THE PREFERRED EMBODIMENT

Figure 1:
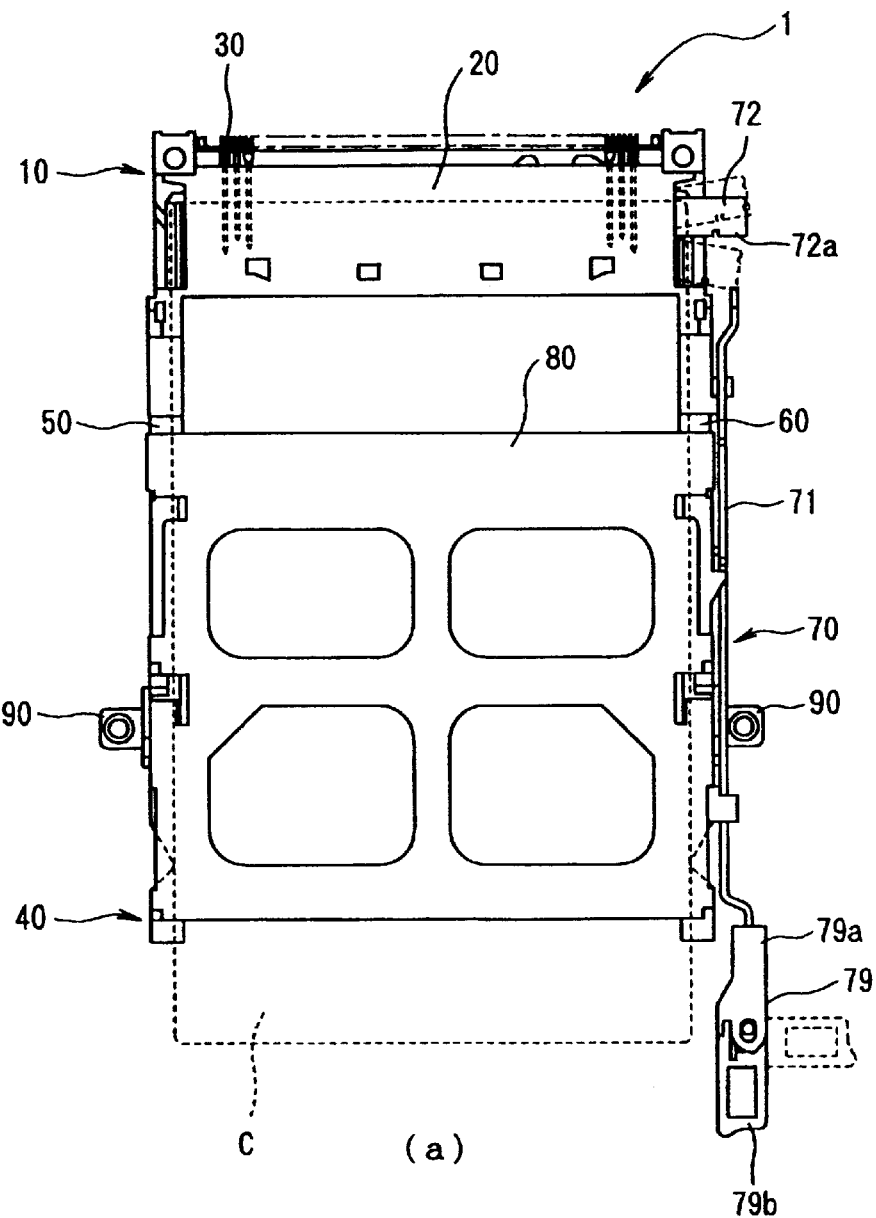
FIG. 1 illustrates the card connector of the present invention.
Figure 1:
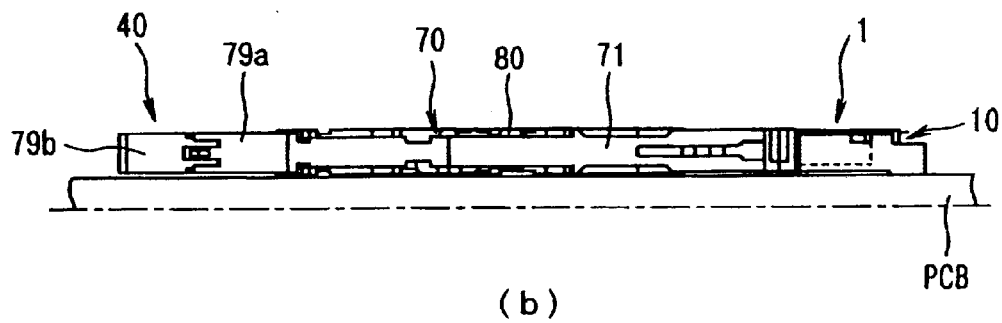

The invention will now be described in greater detail. In FIG. 1, the card connector 1 consists of a header 10 which is mounted on a circuit board, and a frame assembly 40 equipped with an ejection mechanism which is attached to the header 10 and which is also mounted on the circuit board. The card connector 1 receives a card C such as a memory card, communications card or HDD package is received from the rear end of the frame assembly 40 and electrically connected to the circuit board. The card C is ejected by an ejection mechanism 70 which is disposed on the frame assembly 40. The ejection mechanism 70 is equipped with an ejection bar 71 which has an ejector knob 79 attached to its rear end, and an arm 72 which is disposed inside the header 10. Operation of the ejection bar 71 causes the arm to pivot and eject the card C.

Figure 2:
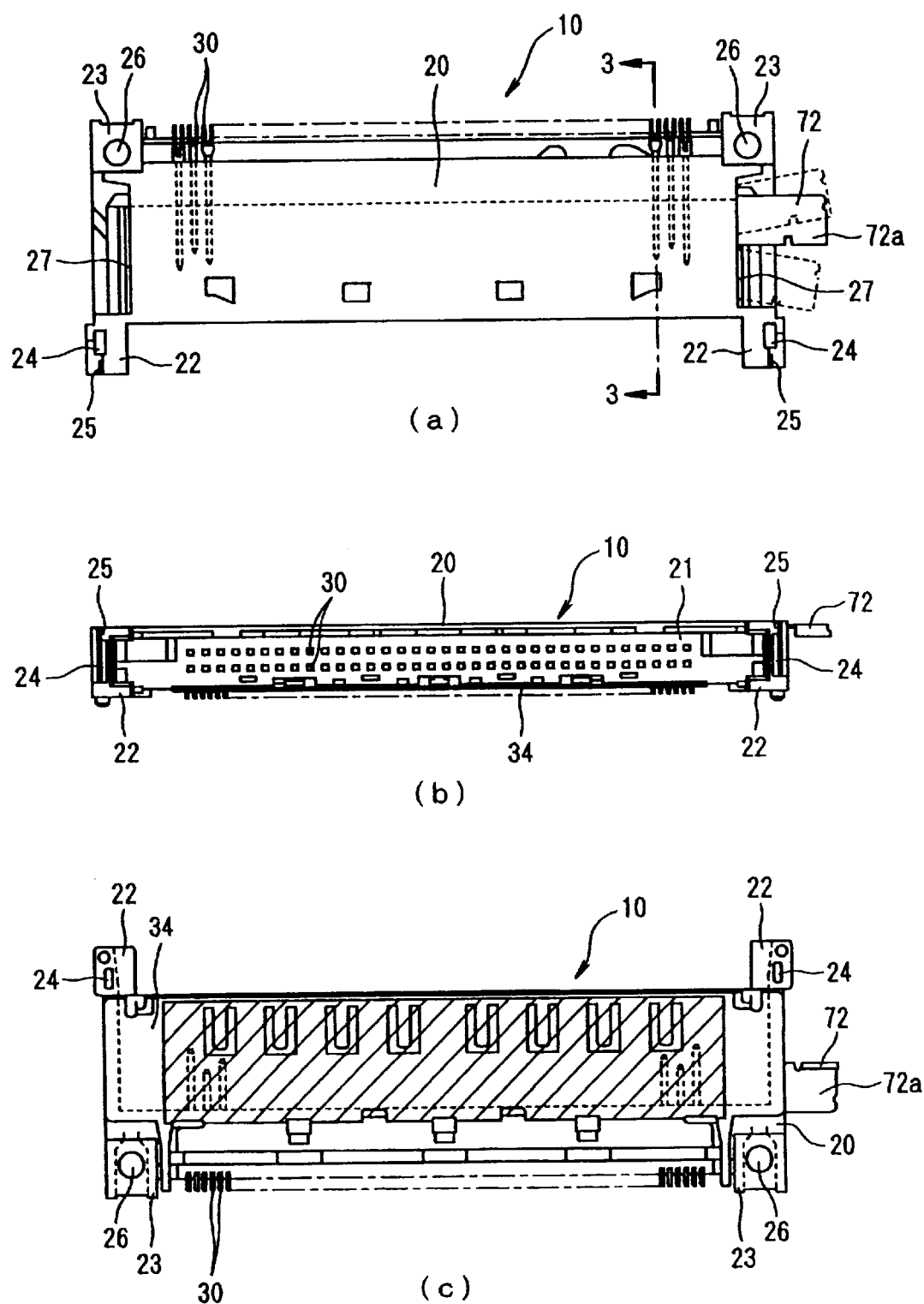
FIG. 2 shows the header.
Figure 3:
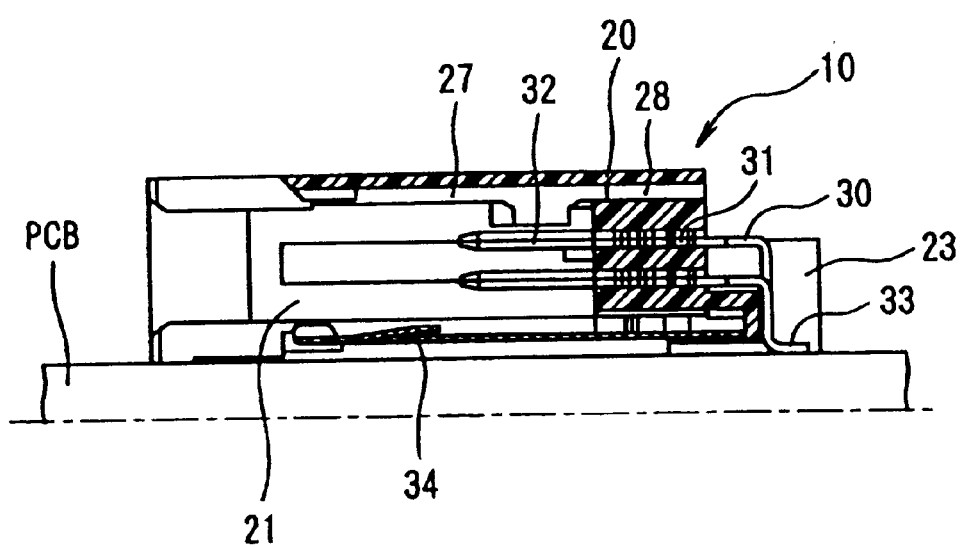
FIG. 3 is a sectional view along line 3—3 in FIG. 2(a). However, the arm is not shown in FIG. 3.
Figure 4:
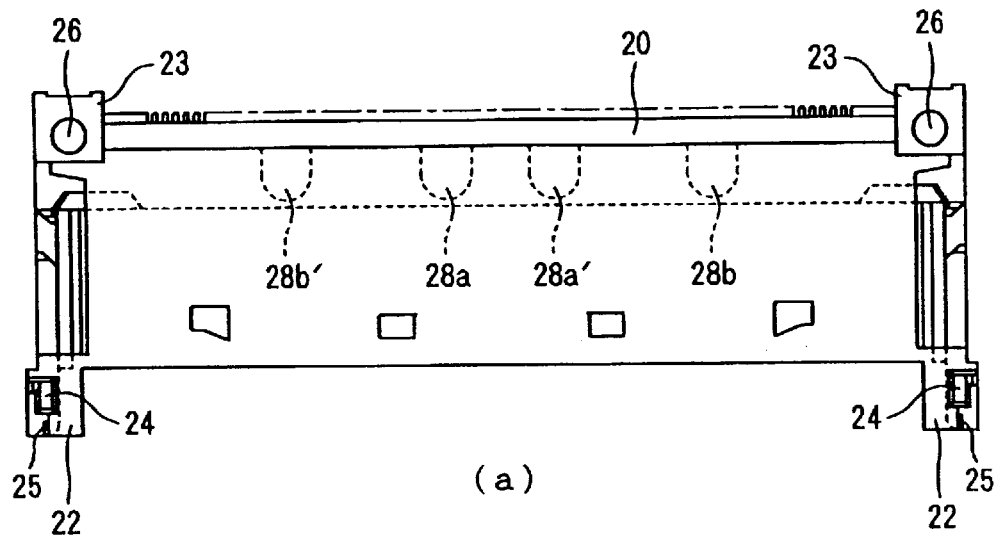
FIG. 4 shows the insulating housing that makes up the header.
Figure 4:
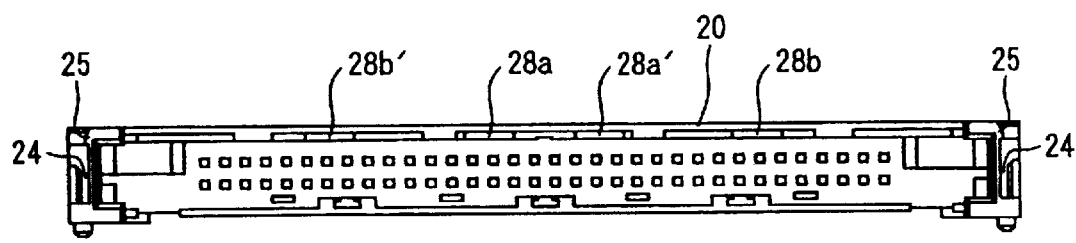
Figure 4:
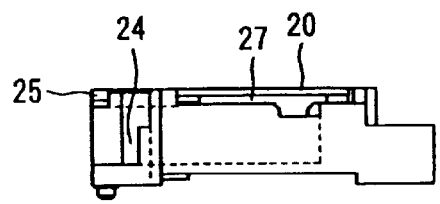

The header 10 will now be described in greater detail with reference to FIGS. 1 through 4. As is shown in FIGS. 1 through 3, the header 10 has an insulating housing 20 which is attached to the surface of the circuit board, and a plurality of electrical contacts 30 which are attached to this insulating housing 20, and which are soldered to conductive pads on the circuit board. As is shown in FIGS. 2 through 4, the insulating housing 20 of the header 10 is constructed as a substantially rectangular body which has inside a card receiving cavity 21 that opens in front (at the bottom in FIG. 2(a)). This housing is preferably formed by molding an insulating material. A pair of arm receiving members 22 that protrude forward and a pair of board mounts 23 that protrude rearward are disposed on the left and right ends of the insulating housing 20. Guide pockets 24 are extend in the respective arm receiving members 22. Engaging sections 25 protrude from the upper portions of the side walls of the respective arm receiving members 22 in front of the guide pockets 24. Through-holes 26 which receive attachment screws (not shown in the figures) to attach the header 10 to the circuit board are formed in the respective board mounts 23. A pair of left and right arm openings 27 which are used for the attachment of the arm 72 are formed in the upper portions of the left and right side walls of the card receiving cavity 21. An arm receiving cavity 28 which accommodates a portion of the arm 72 is formed in the upper part of the rear wall of the card receiving cavity 21.

Referring to FIG. 4, a first projection 28a and second projection 28a act as the pivoting centers of the arm 72. The first projection 28a is the pivot when the arm 72 is disposed so that one end 72a of the arm 72 protrudes from the right-side arm opening 27. The second supporting shaft part 28b' is the pivot when the arm 72 is disposed so that one end 72a of the arm 72 protrudes from the left-side arm opening 27. A metal ground plate 34 for card bus use, which is used to ground the main surface of the accommodated card C to the circuit board is disposed on the bottom portion of the card receiving cavity 21.

The electrical contacts 30 attached to the insulating housing 20 are each equipped with a fastening section 31 which is fastened to the insulating housing 20 by press-fitting, a contact section 32 which extends forward from the fastening section 31 and which is positioned inside the card receiving cavity 21, and a board connection tail 33 which extends rearward from the fastening section 31 and which is soldered to a conductive pad on the circuit board. The electrical contacts 30 are disposed in upper and lower rows along the insulating housing 20. The contact section 32 of the electrical contacts 30 make electrical contact with receptacle contacts inside the card C when the card C is inserted in the card receiving cavity 21.

Next, the frame assembly 40 equipped with an ejection mechanism will be described with reference to FIG. 1 and FIGS. 5 through 10. As is shown in FIGS. 1 through 5, the frame assembly 40 equipped with an ejection mechanism consists of a pair of left and right guide arms 50 and 60 which are disposed on the left and right sides of the insulating housing 20, an ejection mechanism 70 which is attached to the right-side guide arm 60, and a metal frame 80 which connects the left and right guide arms 50 and 60. A pair of brackets 90 which are used for mounting on the circuit board are attached to the left and right guide arms 50 and 60. As is shown in FIG. 6, the right-side guide arm 60 to which the ejection mechanism 70 is attached is constructed from an arm main body 61 which is substantially C-shaped in cross section. This guide arm is preferably formed by molding an insulating material. The right-side guide arm 60 has a shape that shows vertical symmetry with respect to the centerline CL. The space between the upper and lower walls 62 forms a card-guiding groove 63 that accommodates and guides the card C. A plurality of protrusions 64a, 64b, 64c that protrude slightly from the respective walls are formed at specified intervals along the upper and lower walls 62 of the arm main body 61. Separate protrusions 64d are disposed somewhat to the rear of the protrusions 64b. The protrusions 64a, 64b and 64c regulate the rearward movement of the frame 80 that is attached to the left and right guide arms 50 and 60 from above or below and the protrusions 64d regulate the movement of the frame 80 toward the front. Furthermore, the protrusions 64a regulate the movement of the left and right guide arms 50 and 60 toward the inside. Rail projections 65a which support the rear end of the ejection bar 71 are formed to protrude toward the outside on the rear end of the arm main body 61. Supporting projection 65b which supports the front end of the ejection bar 71 is formed to protrude toward the outside on the front end of the arm main body 61. A rear-side stopper 65c which regulates the forward movement of the ejection bar 71 is formed to protrude toward the outside at a location rear of the supporting projection 65b. Front-side stoppers 65d which regulate the rearward movement of the ejection bar 71 are formed to protrude toward the outside at a point that is roughly between the rail projections 65a and supporting projection 65b. A cantilevered resilient leg 66 protrudes toward the outside from a point that is roughly centered on the arm main body. This resilient leg 66 pushes the ejection bar 71 toward the outside, and thus prevents rattling of the ejection bar 71 between the rail projections 65a. This resilient leg 66 is preferably integrally formed with the arm main body 61. The metal ejection bar 71 is therefore electrically isolated from the metal frame 80 preventing to reception of unwanted noise. A pair of insertion holes 69 which are used for the fastening of a bracket 90 are formed to the rear of the resilient leg 66.

A guide member 68 extends from an end of the right-side guide arm 60. Of course, this guide member 68 and connecting section 67 also have shapes that are vertically symmetrical with respect to the centerline CL. When this guide member 68 is accommodated inside the guide pocket 24 formed in the right side of the insulating housing 20 and the upper surface of the connecting section 67 is engaged by the undersurface of the engaging section 25, the right-side guide arm 60 is attached to the header 10. Since the guide member 68 and connecting section 67 have shapes that are symmetrical with respect to the center line CL, the guide member 68 can be accommodated in the guide pocket 24 formed in the left side of the insulating housing 20 by inverting the parts. As a result, the right-side guide arm 60 can be attached to the left side of the insulating housing 20.

Figure 7:
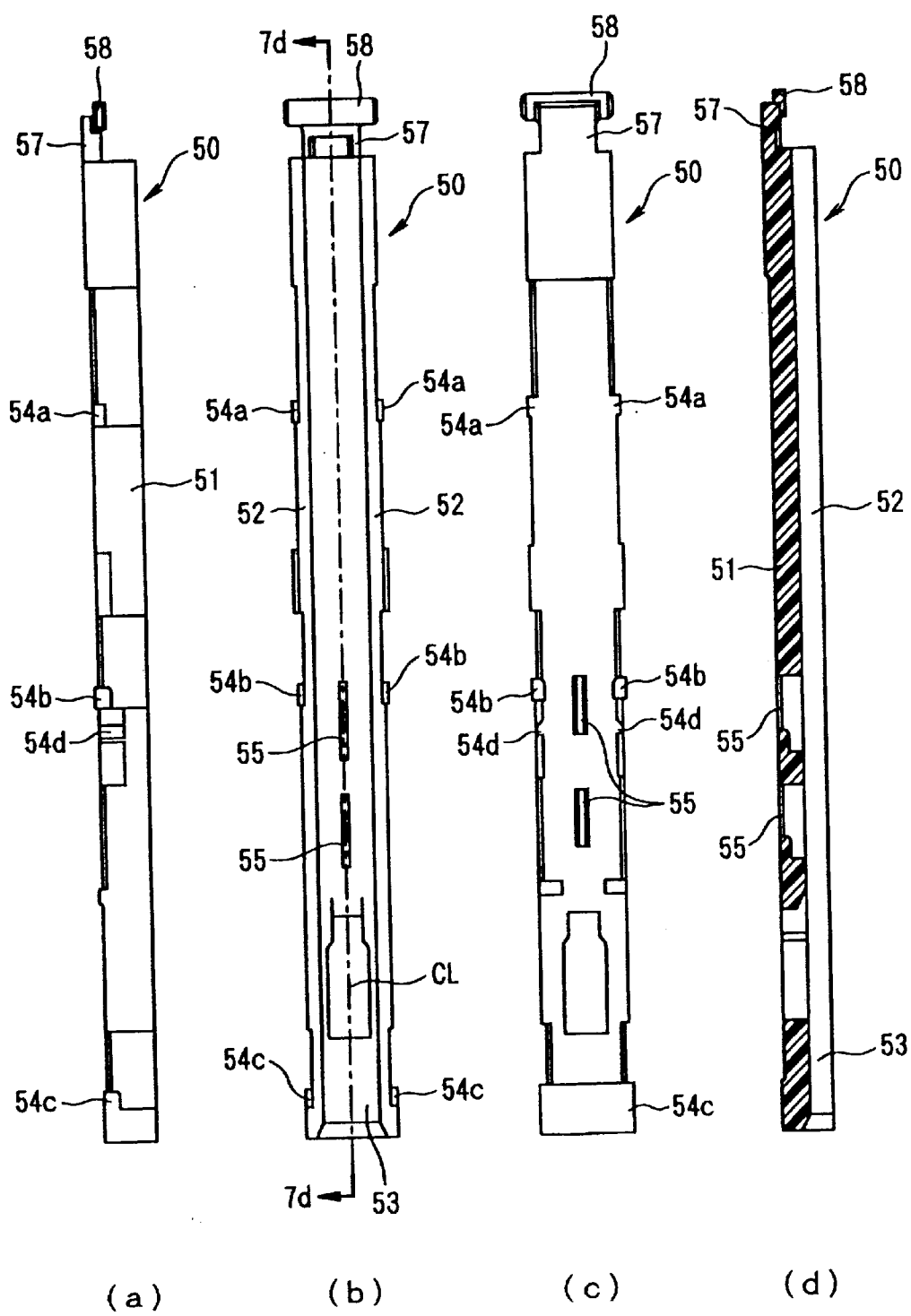
FIG. 7 shows the left-side guide arm.

The left-side guide arm 50 has a shape that is symmetrical to the right-side guide arm 60, except for the portion that attaches the ejection bar 71. Specifically, as is shown in FIG. 7, the left-side guide arm 50 is constructed from an arm main body 51 which is substantially C-shaped in cross section. This guide arm 50 is preferably formed by molding an insulating material. The left-side guide arm 50 is symmetrical with respect to the centerline CL. The space between the upper and lower walls 52 forms a card-guiding groove 53 that accommodates and guides the card C. A plurality of protrusions, 54a, 54b, 54c protrude from the respective walls and are formed at specified intervals along the upper and lower walls 52 of the arm main body 51. Separate protrusions 54d are disposed somewhat to the rear of the protrusions 54b. The protrusions 54a, 54b and 54c regulate the rearward movement of the frame 80 that is attached to the left and right guide arms 50 and 60 from above or below, and the protrusions 54d regulate the movement of the frame 80 toward the front. A pair of insertion holes 55 which are used for the fastening of a bracket 90 are formed in the rear end of the arm main body 51.

A guide member 58 is disposed on an end of the left-side guide arm 50 similar to the right-side guide arm 60. This guide member 58 and connecting section 57 also have shapes that are symmetrical with respect to the centerline CL. When this guide member 58 is accommodated inside the guide pocket 24 formed in the left side of the insulating housing 20 and the upper surface of the connecting section 57 is engaged by the undersurface of the engaging section 25, the left-side guide arm 50 is attached to the header 10. Since the guide member 58 and connecting section 57 have shapes that are symmetrical with respect to the center line CL, the guide member 58 can be accommodated in the guide pocket 24 formed in the right side of the insulating housing 20 by inverting the parts. As a result, the left-side guide arm 50 can be attached to the right side of the insulating housing 20. Thus, the left and right guide arms 50 and 60 are interchangeable between the left and right sides of the insulating housing 20.

Figure 8:
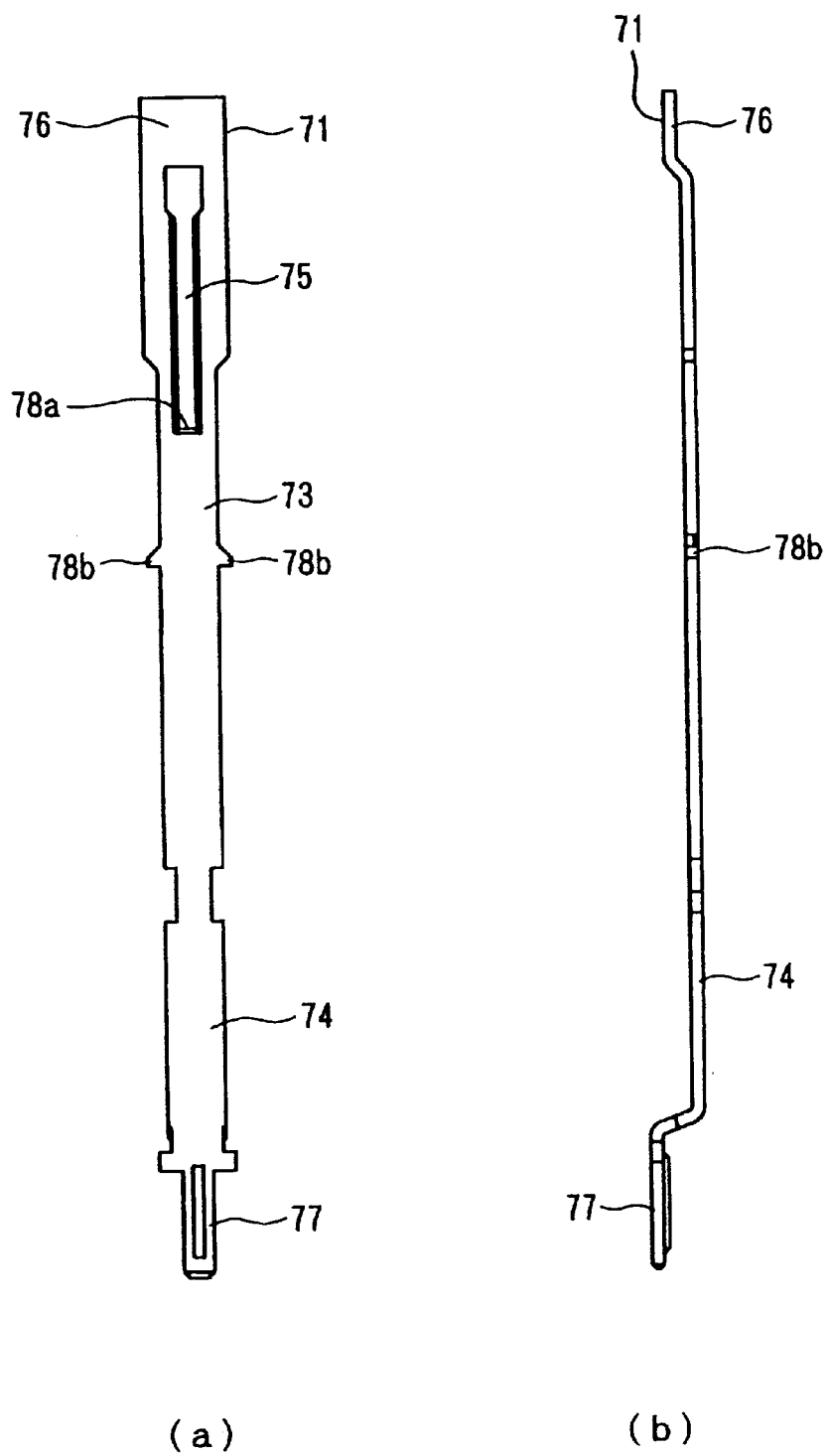
FIG. 8 shows the ejection bar.

Referring to FIG. 1(a), the ejection mechanism 70 is equipped with an ejection bar 71 which has an ejector knob 79 attached to its rear end, and an arm 72 which is disposed so that it can pivot inside the header 10 to eject the card C as a result of operation of the ejection bar 71. The ejection bar 71 is constructed from a substantially flat main body 73 as shown in FIG. 8. This main body 73 is preferably formed by stamping and bending a metal plate. A supporting plate 74, disposed on the rear end of the bar main body 73, is slidingly supported by the rail projections 65a of the right-side guide arm 60 so that movement is possible in the forward-rearward direction. A supporting opening 75 formed in the front end of the bar main body 73 is supported by the insertion of the supporting projection 65b so that movement is possible in the forward-rearward direction. The rear edge of this supporting opening 75 forms a first stopper 78a which limits the forward movement of the ejection bar 71 by contacting the rear stopper 65c of the right-side guide arm 60 when the ejection bar 71 moves forward. Furthermore, a second stopper 78b protrudes from roughly the central part of the bar main body 73 to limit the rearward movement of the ejection bar 71 by contacting the front stoppers 65d of the right-side guide arm 60 when the ejection bar 71 moves rearward. The rear end of the bar main body 73 receives the ejector knob 79, and the front end of the bar main body 73 forms an arm urging member 76 that moves forward and presses against one end 72a of the arm 72. Furthermore, as is shown in FIG. 5(a), the ejector knob 79 consists of a fixed member 79a which is press fit to the rear end of the of the ejection bar 71, and a pivoting member 79a which is attached to the fixed member.

Figure 5:
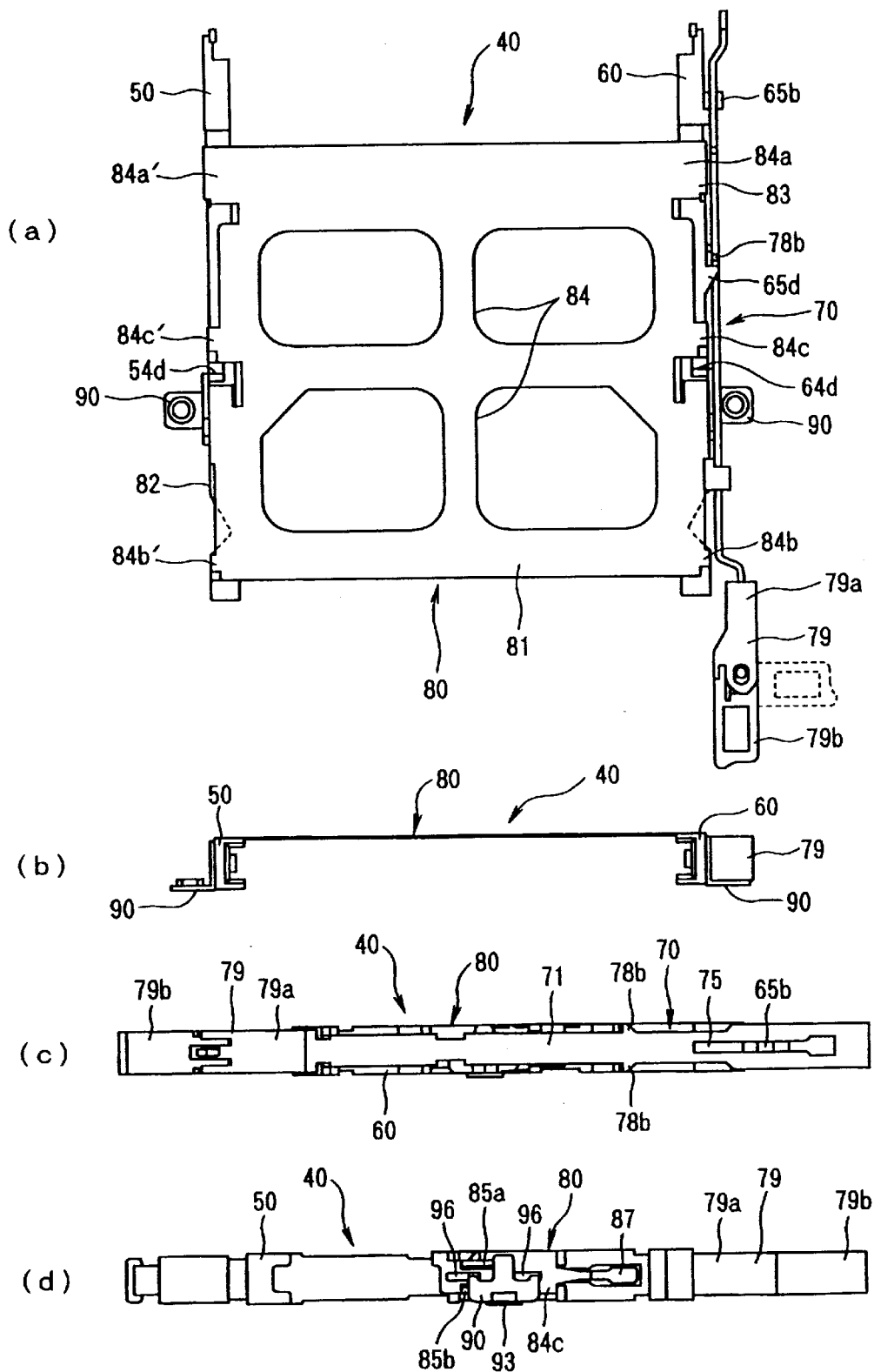
FIG. 5 shows the frame assembly equipped with an ejection mechanism.
Figure 6:
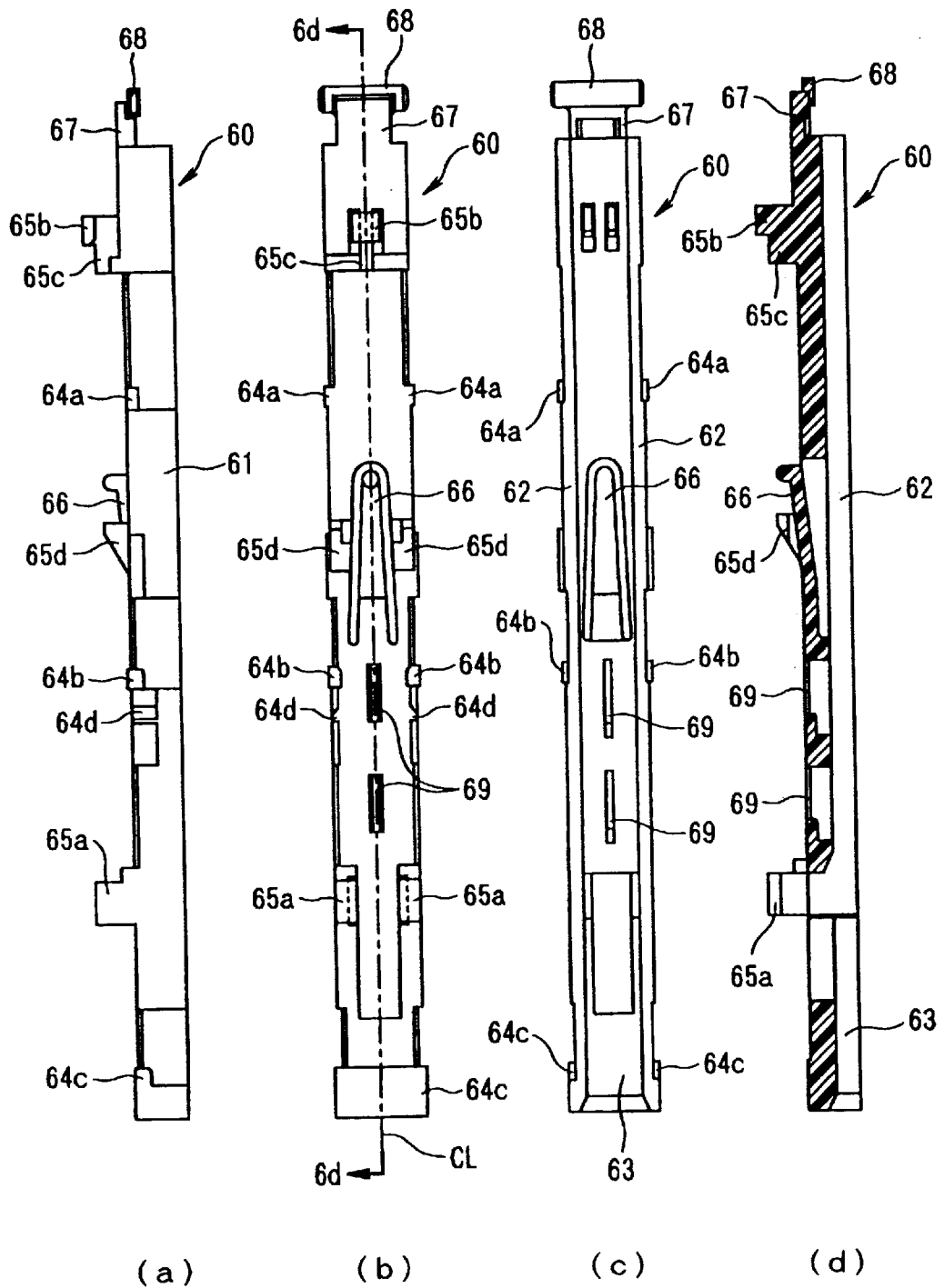
FIG. 6 shows the right-side guide arm to which the ejection bar is attached.
Figure 9:
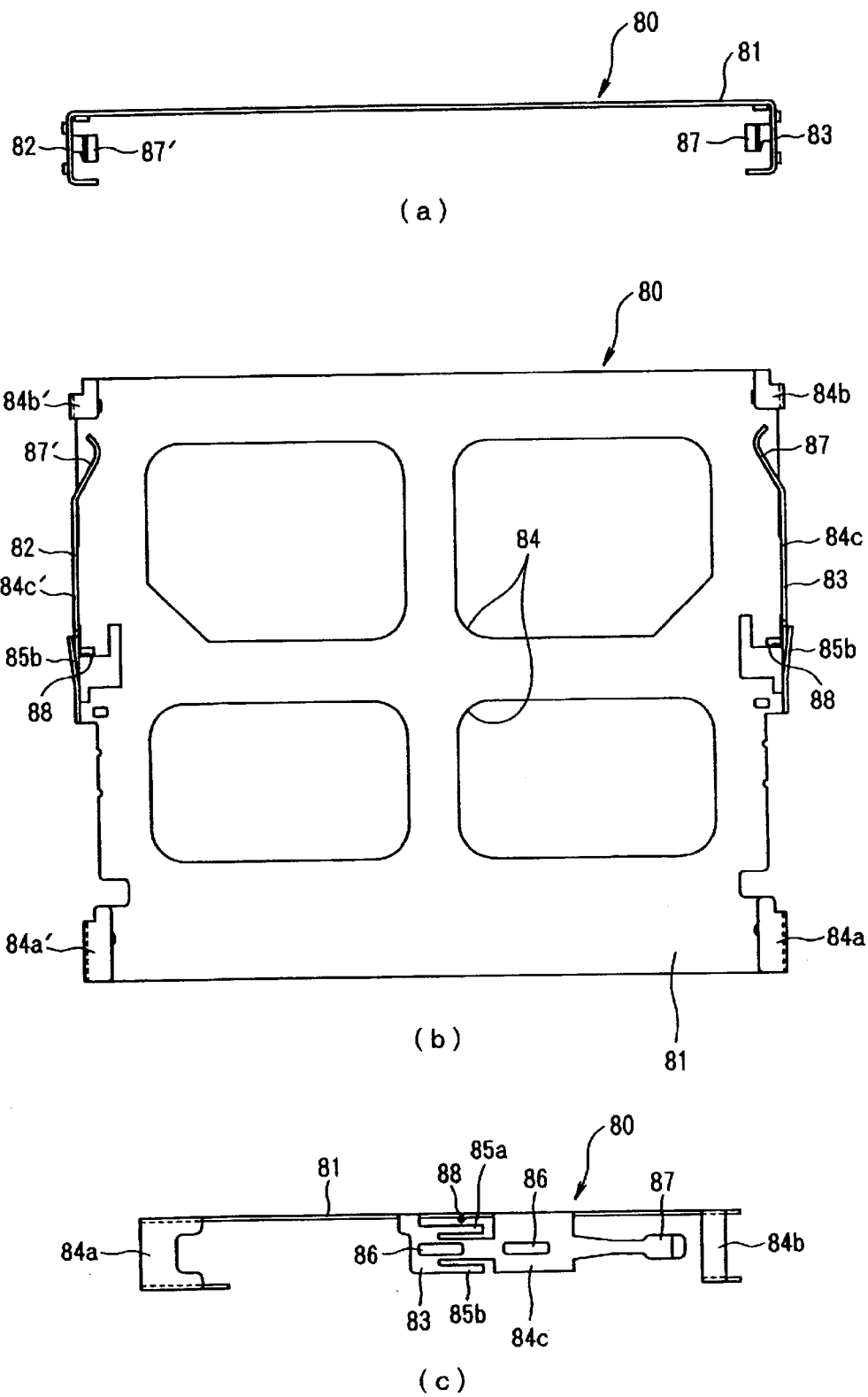
FIG. 9 shows the frame.

As is shown in FIGS. 5 and 9, the metal frame 80 has left and right attachment sections 82 and 83. These attachment sections 82, 83 have a plurality of openings 84 for receiving the left and right guide arms 50 and 60. The frame 80 is formed in a symmetrical shape so that it can be attached to the respective left and right guide arms 50 and 60 from above or below. The left and right attachment sections 82 and 83 respectively have front-side attachment sections 84a' and 84a, rear-side attachment sections 84b' and 84b, and intermediate attachment sections 84c' and 84c. A pair of tongues 88 are disposed on the flat metal plate 81 to the inside of both intermediate attachment parts 84c' and 84c to limit the forward movement of the frame 80 by engagement with the rear ends of the protrusions 54d and 64d of the left and right guide arms 50 and 60.

As is shown most clearly in FIG. 9(c), a pair of through-holes 86 through which a 84c, and a pair of springs 85a, 85b are cut out and raised on the upper and lower sides of the through-holes 86. In these pairs of springs 85a, 85b, the spring 85b on the lower side elastically contacts the under-surface of the bracket 90 when the bracket 90 is attached to the frame 80 so that the board mount 93 of the bracket 90 is positioned on the opposite side. In this case, the spring 85a on the upper side engages with the sidewall of the upright member 94 of the bracket 90. Conversely, when the bracket 90 is attached to the frame so that the board mount 93 of the bracket 90 is positioned on the same side, the spring 85b on the lower side engages with the side wall of the upright member 94 of the bracket 90. A pair of cantilever arms 87' and 87 protrude inward from the intermediate attachment parts 84c' and 84c to contact the metal parts of the side surfaces of the accommodated card C.

Figure 10:
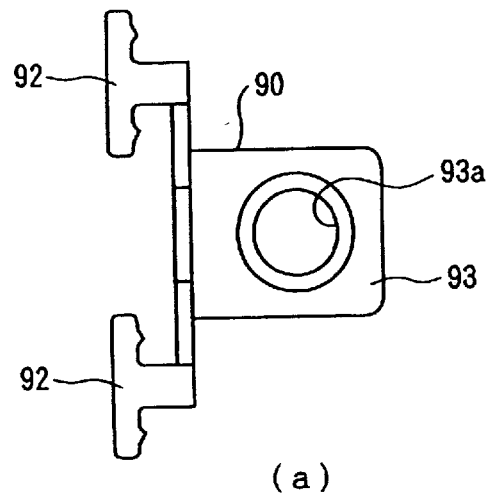
FIG. 10 shows one of the brackets.
Figure 10:
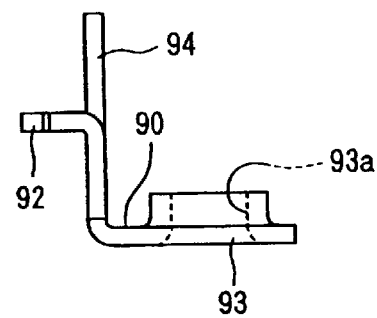
Figure 10:
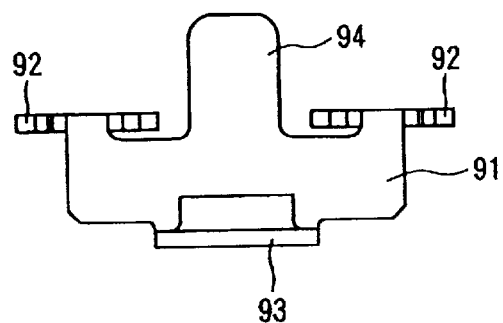
Figure 11:
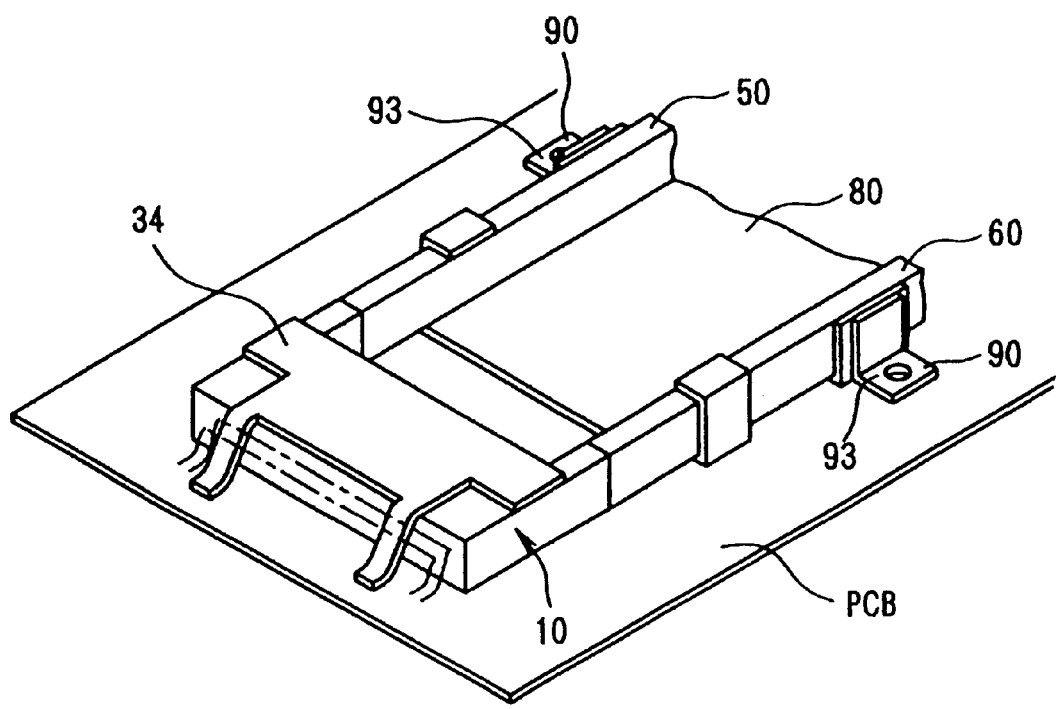
FIG. 11 is a perspective view which schematically illustrates an alternate embodiment of the card connector shown in FIG. 1.
Figure 12:
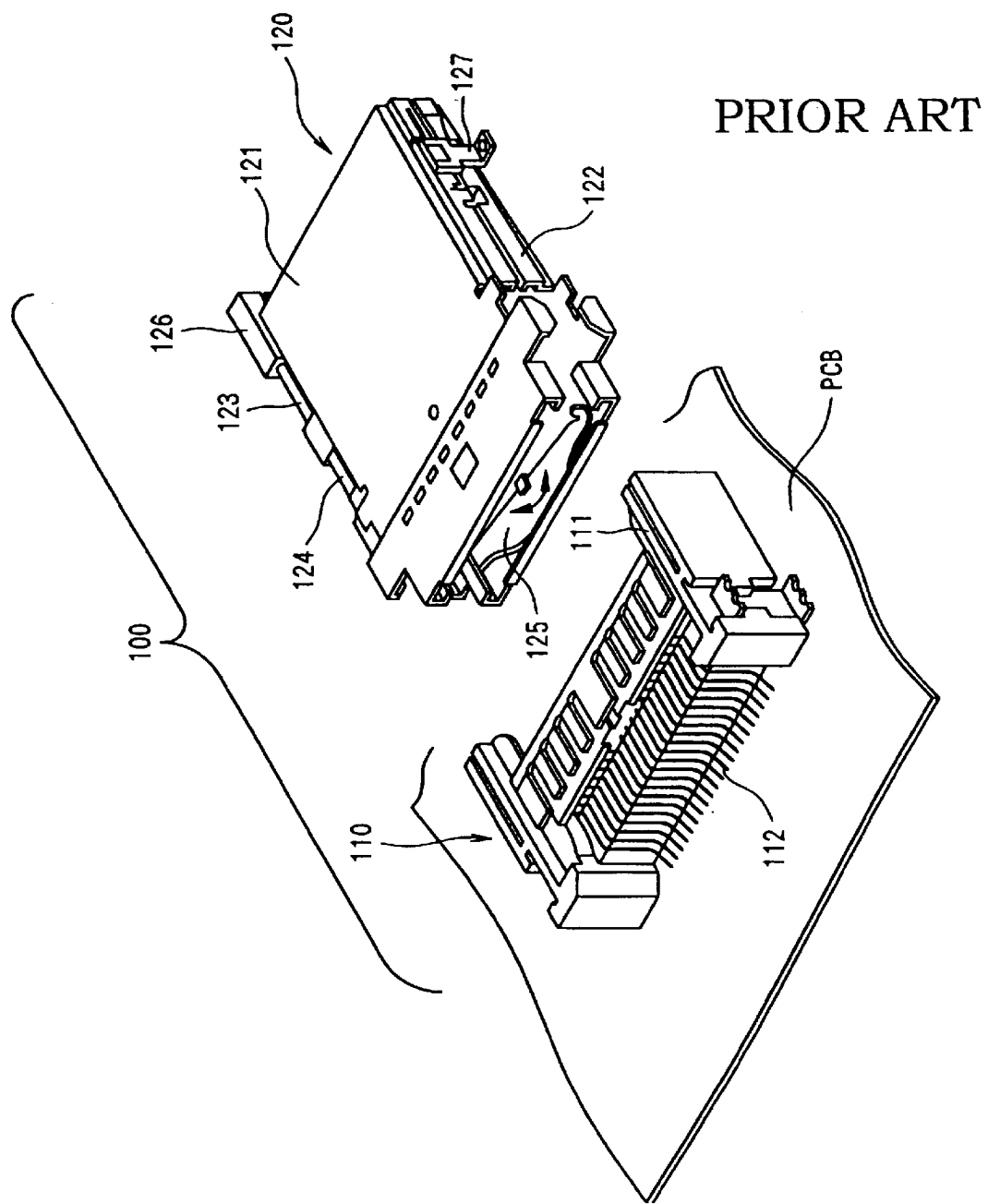
FIG. 12 is a perspective view of a prior art card connector.

Referring to FIG. 10, each of the brackets 90 is preferably formed by stamping and bending a metal plate, and has a flat base 91, a board mount 93 which is bent to the outside from the lower end portion of the base 91, and a pair of engaging sections 92 which are bent inward from the front and rear ends of the upper edge. An upright member 94 which extends upward from the central portion of the upper edge is provided, and a screw hole 93a is formed in the board mount 93. The respective brackets 90 can be mounted on either the left or right guide arms 50 and 60 from above or below.

Assembly and mating will now be described in greater detail. In order to assemble the card connector 1, a plurality of electrical contacts 30 are first fastened to the insulating housing 20 by press-fitting to complete the header 10 assembly. Then, the arm 72 is installed inside the insulating housing 20 of the header 10 so that one end 72a of the arm 72 protrudes from the right-side arm opening 27 as shown in FIG. 2.

Meanwhile, in parallel with the assembly of the header 10, the frame assembly 40 equipped with the ejection mechanism, excluding the arm 72, is assembled. As is shown in FIG. 5, the left and right guide arms 50 and 60 are respectively attached to the left and right attachment sections 82 and 83 of the frame 80 from the insides of the left and right attachment sections 82 and 83. The upper surfaces, side surfaces and undersurfaces of the respective front ends of the left and right guide arms 50 and 60 are clamped by C-shaped front-side attachment parts 84a' and 84a of the frame 80. The upper surfaces, side surfaces and undersurfaces of the respective cross-sectionally C-shaped rear-side attachment parts 84b' and 84b of the frame 80. As a result, the frame 80 is attached to the upper sides of the left and right guide arms 50 and 60. Then, the brackets 90, 90 are respectively attached to the left and right guide arms 50 and 60 so that the respective board mounts 93 are positioned on the lower side with respect to the frame 80. Specifically, the engaging sections 92 of the espective brackets 90 are inserted into the respective through-holes 55 and 69 of the left and right guide arms 50 and 60 via the through-holes 86 in the frame 80. The ejection bar 71 is then attached to the right-side guide arm 60 so that the supporting opening 75 of the ejection bar 71 is supported by the projection 65b of the right-side guide arm 60, and so that the supporting plate 74 is supported by the rail projections 65a. As a result, the frame assembly 40 equipped with the ejection mechanism is completed.

Then, as is shown in FIG. 3, the board connection tines 33 are soldered to the conductive pads on the circuit board, and the board mounts 23 of the header 10 are attached to the circuit board by attachment screws (not shown in the figures).

Afterward, the guide members 58 and 68 are then inserted from above into the guide pockets 24 of the header 10, and the upper surfaces of the connecting sections 57 and 67 are engaged by the undersurfaces of the engaging sections 25. As a result, the frame assembly 40 equipped with the ejection mechanism (excluding the arm 72) is attached to the header 10 such that the frame 80 is positioned on the side opposite the circuit board. Then, the board mounts 93 of the left and right brackets 90, 90 are screwed to the circuit board such that the board mounts 93 contact the ground pattern on the circuit board.

When the card C is inserted from the rear of the frame assembly 40 the electrical contacts inside the card C contact the contact sections 32 of the electrical contacts 30 in the header 10, so that the card C and circuit board are electrically connected to each other. The outside casing of the card C also contacts the metal ground plate 34 to ground the card to the circuit board. Furthermore, the metal parts of both sidewalls of the card C contact the pair of tongues 87' and 87 of the frame 80. When the metal parts of both side walls of the card C contact the pair of tongues 87' and 87 of the frame 80, they are grounded to the circuit board via the brackets 90, 90. Then, when this card C is to be pulled out of the connector 1, the card C is ejected from the connector 1 by pushing the ejection bar 71 forward so that the arm 72 is caused to swing. Cutouts are formed in the portion of the circuit board on which the card C is accommodated, so that accommodation is also possible in the case of HDD packages, in which the thickness of the card C is large.

Here, in cases where it is desired to replace the frame assembly 40 equipped with the ejection mechanism after this frame assembly 40 has been mounted on the circuit board, the attachment screws attached to the board mounts 93 are removed, and the left and right guide arms 50 and 60 are slightly twisted to release the connecting sections 57 and 67 from the engaging sections 25. Then, the guide members 58 and 68 are pulled out of the guide pockets 24. Accordingly, the frame assembly 40 equipped with the above-mentioned ejection mechanism can be simply and easily replaced even after the header 10 has been soldered to the circuit board.

In cases where it is desired from the outset to mount the ejection bar 71 on the left side of the header 10 instead of the right side, the arm 72 is first installed inside the insulating housing 20 of the header 10 so that one end 72a of the arm 72 protrudes from the left-side arm opening 27. Then, this header 10 is mounted on the circuit board as described above. Afterward, the frame 80 is attached to the undersides of the left and right guide arms 50 and 60. The respective brackets 90, 90 are attached to the left and right guide arms 50 and 60 so that the respective board mounts 93 are positioned on the upper side of the frame 80. Then, in this state, the ejection bar 71 is attached to the side surface of the right-side guide arm 60, and the entire body is inverted so that the frame 80 is positioned on the upper side of the left and right guide arms 50 and 60. Afterward, the guide member 58 of the left-side guide arm 50 is inserted from above into the guide pocket 24 formed in the right side of the insulating housing 20, and the guide member 68 of the right-side guide arm 60 is inserted from above into the guide pocket 24 formed in the left side of the insulating housing 20 of the header 10. Thus, without any need for additional parts, the ejection bar 71 used to eject the card C can be attached on the left or right using a minimal number of parts. Furthermore, since the right side guide arm 60 to which the ejection bar 71 is attached is interchanged with the left-side guide arm 50 to which the ejection bar 71 is not attached, there is no change in the width of the overall connector.

An embodiment of the present invention has been described above. However, the present invention is not limited to this embodiment and various alterations are possible. For example, the header 10 is a header in which a metal ground plate 34 is installed on the side of the circuit board. However, it would also be possible to install this ground plate 34 on the opposite side of the header. In this case, the frame 80 would installed on the underside and the board mounts 93 of the brackets 90 are installed on the same side as the frame 80. If this is done, then the upper side of the frame 80 is open to accommodate a thick HDD package without cutting away the circuit board. Of course, in this case as well, the left and right guide arms 50 and 60 are interchangeable, and the frame 80 can be attached to the respective left and right guide arms 50 and 60 from above or below. Accordingly, attachment of the ejection bar 71 on the left or right can be accomplished using a minimal number of parts.

Furthermore, in the preferred embodiment, the ejector knob 79 attached to the ejection bar 71 uses a "rotary type button" which has a fixed part 79a and a pivoting part 79a. However, it would also be possible to use a "push-push type button" which uses a cam mechanism so that the button is caused to protrude to the outside from the computer casing when the card is to be ejected, and so that the button is pulled into the inside of the computer casing when the card is to be accommodated.

What is claimed is:

1. A card connector having a header positioned at a rear end and an eject mechanism, the card connector comprising:
   a pair of interchangeable guide arms for receiving a card, the guide arms being disposed on right and left sides of the header, attached to a frame, and configured to selectively receive an ejection bar;
   each of the guide arms having a symmetrical profile about a centerline extending along the length of the respective arm for interchangeability and a resilient leg extending outward thereform to urge a side of the ejection bar.

2. The card connector of claim 1 further comprising a pivoting arm disposed within the header, the arm being engageable with the ejection bar to eject a card.

3. The card connector of claim 2 wherein the header further comprises a plurality of pivot projections extending into a card receiving cavity from the rear end.

4. The card connector of claim 3 wherein the pivot projections are positioned to accommodate the arm in either a left bar or right bar orientation.

5. The card connector of claim 1 further comprising an eject button affixed to an end of the ejection bar.

6. The card connector of claim 1 wherein the ejection bar in receivable in either guide arm.

* * * * *